Feb. 13, 1934.     E. W. HUTCHINGS     1,947,395
FABRICATING BOARD
Filed Jan. 12, 1932
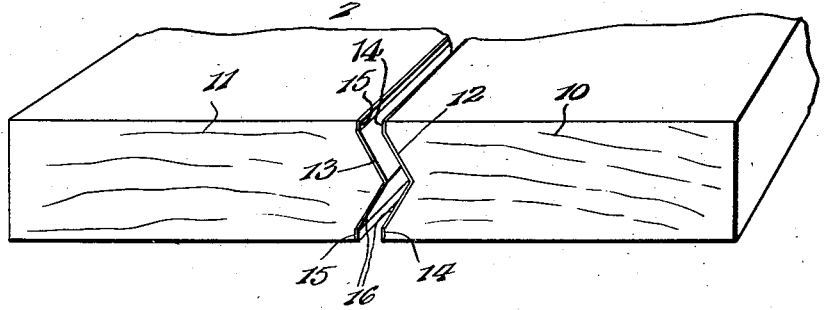
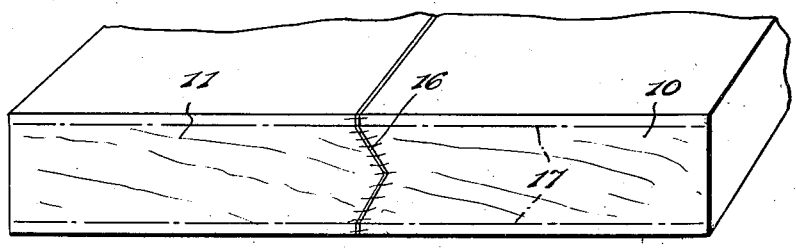
Inventor
E. W. Hutchings.
By Lacey & Lacey,
Attorneys Patented Feb. 13, 1934

1,947,395

UNITED STATES PATENT OFFICE 1,947,395

FABRICATING BOARD

Edward W. Hutchings, Perry, Fla.

Application January 12, 1932. Serial No. 586,219

2 Claims. (Cl. 144—309)

This invention relates to methods of fabricating boards and has for an object to so shape the interfitting boards at the joint as to produce a strong rigid joint in the finished product and at the same time save a great deal of lumber that is usually consumed in the jointing machine.

A further object is to provide a method of fabricating boards in which there is initially formed on the edges to be jointed glue lips at a right angle to the surface of the board and positioned at the ends of a V tongue and groove for the purpose of resisting stress during the pressure operation so that an extremely tight and practically invisible joint is produced when the boards are dressed to remove the glue lips.

A further object is to provide a method of fabricating lumber in which the joint will occupy considerably less space in the fabricated product than hitherto possible so that a greater area can be covered by a given number of boards fabricated in accordance with my invention than by the usual tongue, groove, dovetail, Linderman, or any other fabricated board.

For a complete understanding of the steps to be taken in carrying out the method reference is made to the accompanying drawing in which, Figure 1 is an end elevation of two boards cut at the contiguous longitudinal edges to provide V tongue and groove and glue lips at the ends thereof at a right angle to the plane of the boards, Figure 2 is a view similar to Figure 1 but showing the boards united, the surface to be dressed off being indicated by dot and dash lines, and Figure 3 is an end elevation of the finished product.

Referring to Figure 1 it will be seen that a pair of rough boards, 10 and 11, are prepared for jointing by providing in the longitudinal edge of one of the boards to be jointed a V groove 12 the bevel of which is preferably fifteen to twenty degrees, and forming in the mating board a V tongue 13 of identical bevel and location to accurately fit in the groove.

At the ends of the tongue and groove I provide glue lips 14 and 15 which are disposed in planes perpendicular to the surface of the board and are adapted, as best shown in Figure 2, to abut each other when the tongue is inserted in the groove for jointing.

It is preferable to fabricate the boards with cold water glue and apply the same uniformly between the opposing tongue and groove and glue lips, as best shown at 16.

The fabricated rough board in the condition shown in Figure 2 may now be subjected to pressure in the usual manner to unite the glued surfaces of the joint. Particular attention will be directed to the fact that if the fabricated board while under pressure has excess oblique stress on the top side, laterally of the joint, the glue lips on the bottom will resist the stress while on the other hand if the stress is on the bottom the stress is resisted by the glue lips on the top side so that the glued faces of the tongue and groove will not be disturbed and thus a substantially perfect bond between said surfaces will result.

Furthermore, it is found in practice that the shoulders or glue lips function to retain the glue inside of the board when the board is under pressure in making the joint so that when the final step is taken, that is, dressing the board, as shown by dot and dash lines in Figure 2, to the depth of the glue lips, the adhesive bond from the apex to the ends of the tongue and groove will be found to be uniform in thickness or density, which is not ordinarily the case in other type joints of usual construction, since the glue is squeezed out of the joint when the boards are under pressure.

As heretofore stated the final step of the process consists of dressing the boards to the dot and dash lines, shown in Figure 2, to remove the glue lips and give a finish to the surface. In the completed product, as best shown by Figure 3, the glue joint will be found to be practically invisible so that the jointed boards present the appearance of a single board, while at the same time the glue has so impregnated the bevel opposing surfaces of the board that an extremely strong rigid unitary fabricated board is produced. It will be pointed out that dressing of lumber is a necessary step in the production of building material so that this step cannot be considered as a waste of material. The waste of material hitherto resulting from consumption of material in the jointing machine when forming tongue and groove joints of any type whatever, has been found to be reduced to a very appreciable extent by the use of the above described method of jointing.

As a concrete example of saving of material, in which the saving is approximately 12½% over any other known method of fabricating lumber, it will be stated that 250 pieces of 1" by 4" lumber fabricated by the above method will cover exactly 937.5 square inches. The same number of pieces of the same size, when fabricated with the usual tongue and groove, dovetail or Linderman joint will lay only 875 square inches. In other words, there is a saving of 125 square inches on each 1,000 feet of 1" by 4" lumber, and this 125 square inches is ordinarily consumed in the jointing machine. It has been found in practice that a strong rigid joint is produced by the above described method without requiring the width of joint hitherto necessary in standard practice. As an example, it will be stated that in practice a 1" by 4" board, or in fact any given width, can be jointed ¼" less than rough size. By any other method it takes ⅜" to ½" to joint a board.

From the above description it is thought that the steps of my improved jointing method will be fully understood without further explanation.

What is claimed is:

1. A method of fabricating boards consisting of forming on the confronting edges thereof interfitting tongue and groove surfaces which merge at the ends into glue lips disposed at substantially a right angle to the plane of the board, applying glue to the surfaces and glue lips, uniting the glued surfaces and lips under pressure, and dressing the boards to the depth of the glue lips.

2. A method of fabricating lumber consisting of forming contiguous boards at the edges to be jointed with V shaped tongue and groove surfaces the bevel of which ranges from approximately fifteen degrees to approximately 20 degrees and extends to the center of thickness of the boards, forming glue lips at the ends of said surfaces disposed at substantially a right angle to the plane of the board, bonding the surfaces and lips together with glue while subjecting the boards to pressure, and dressing the boards to the depth of the glue lips.

EDWARD W. HUTCHINGS. [L. S.]